United States Patent [19]
Barefoot et al.

[11] 3,913,924
[45] Oct. 21, 1975

[54] ROTARY SHAFT SEAL WITH EXPANDABLE OUTER PERIPHERY

[75] Inventors: Gerald A. Barefoot, Ann Arbor; George L. Corsi, Southfield, both of Mich.

[73] Assignee: Federal-Mogul Corporation, Southfield, Mich.

[22] Filed: Aug. 31, 1973

[21] Appl. No.: 393,583

[52] U.S. Cl. .................................. 277/37; 277/181
[51] Int. Cl.² ..................... F16J 15/24; F16J 15/32
[58] Field of Search ................ 277/37, 43, 44, 181

[56] References Cited
UNITED STATES PATENTS

| | | | |
|---|---|---|---|
| 3,028,203 | 4/1962 | Lund et al. ......................... | 277/181 |
| 3,614,183 | 10/1971 | Berens .................................. | 277/37 |

FOREIGN PATENTS OR APPLICATIONS

| | | | |
|---|---|---|---|
| 859,860 | 1/1961 | United Kingdom .................. | 277/37 |

*Primary Examiner*—Robert I. Smith
*Attorney, Agent, or Firm*—Owen, Wickersham & Erickson

[57] ABSTRACT

A rotary shaft seal of the type that has a case which fits loosely in a bore and relies for sealing upon a synthetic rubber extension that is bonded to the case and is adapted to be expanded outwardly to seal against the bore wall, as a result of pressure axially exerted thereagainst by metal members. The extension has an outer cylindrical wall and an inner wall having a series of axial grooves in alternation with a series of axial ribs. The ribs provide stiffness and assure outward flexing of the extension against the bore wall, rather than useless inward flexing, when the axially exerted pressure is applied. The grooves also provide space for accommodating displacement of the rubber when the space between the bore walls and the adjacent metal members has been occupied by rubber before complete seating of the seal has been achieved. This accommodation of rubber needing room for displacement thereby enables the necessary complete seating.

2 Claims, 7 Drawing Figures

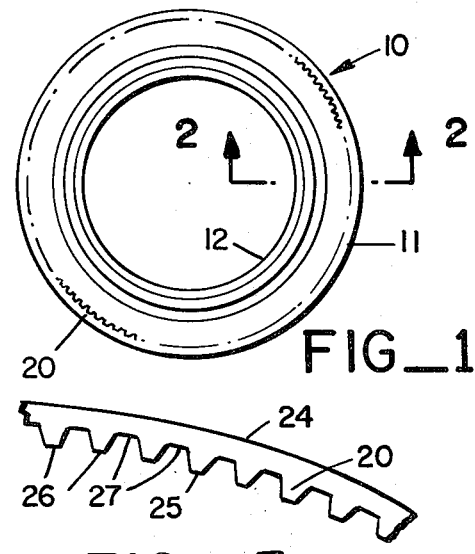
FIG_1
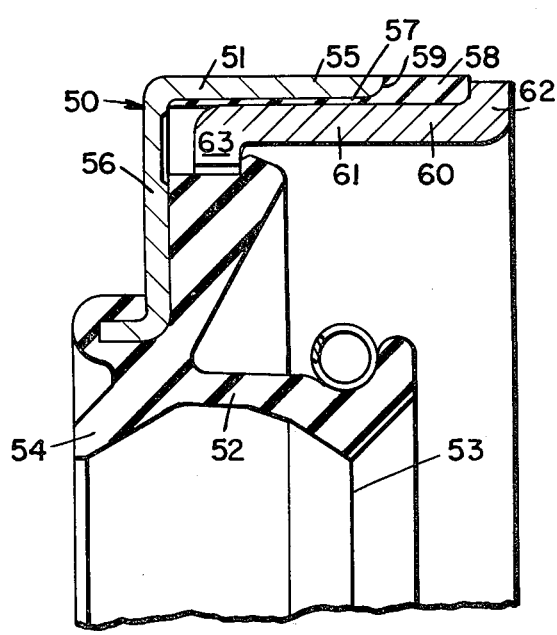
FIG_7
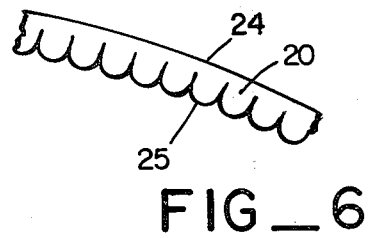
FIG_3
FIG_6
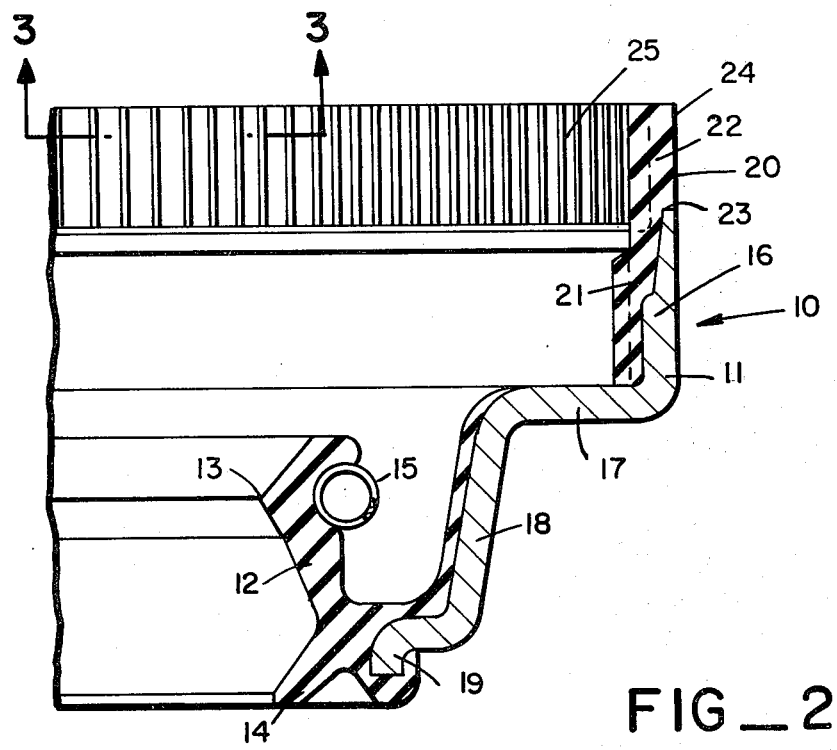
FIG_2

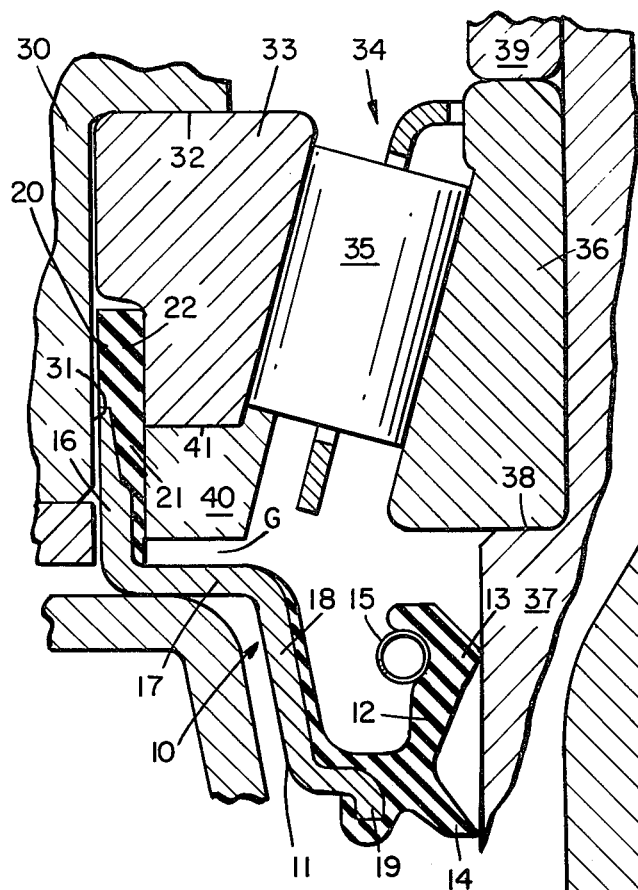
FIG_5
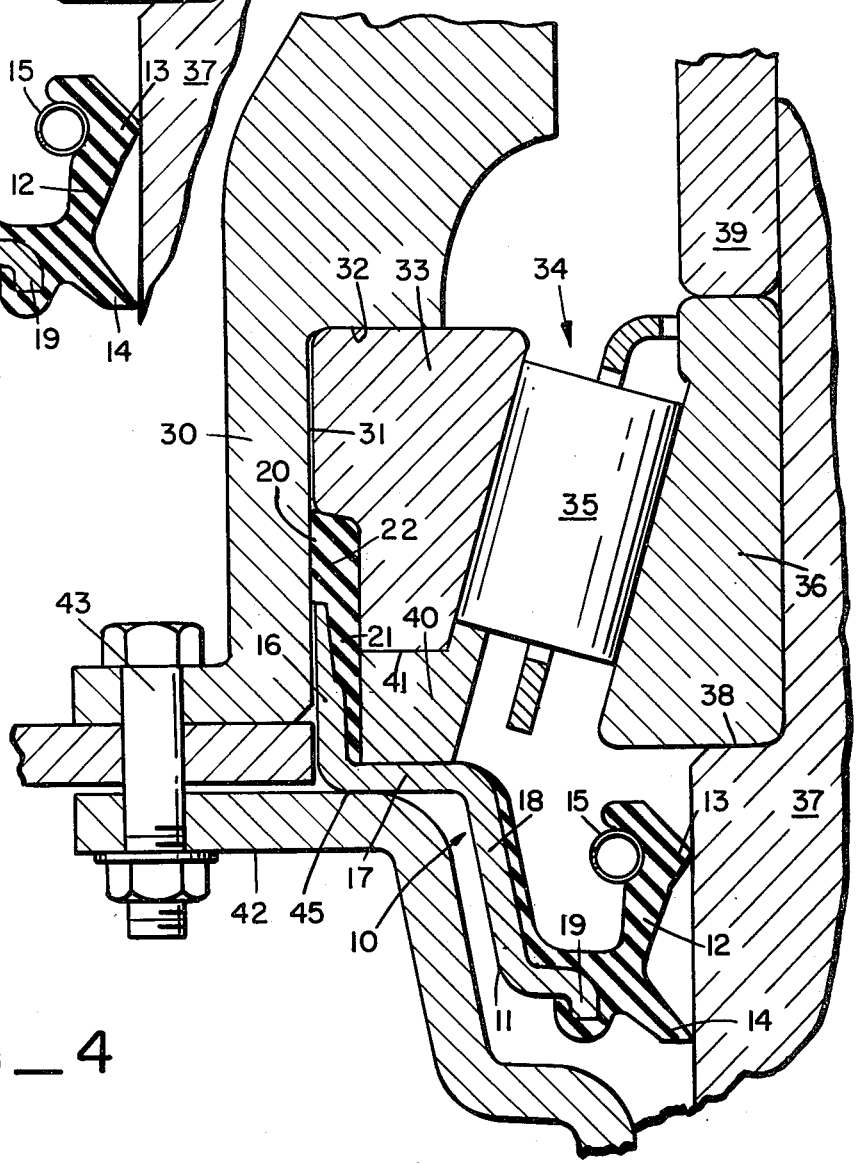
FIG_4

ROTARY SHAFT SEAL WITH EXPANDABLE OUTER PERIPHERY

BACKGROUND OF THE INVENTION

This invention relates to a rotary shaft seal of the type where the seal case is utilized in transmitting thrust, as when such thrust is needed to seat the components of a bearing. In this type of seal, the seal case fits slidably and rather loosely in the bore instead of sealing against the bore walls, and a generally cylindrical extension member of elastomer bonded to the case is intended to be flexed outwardly to accomplish the case-to-bore sealing.

This invention relates to problems which have confronted seals of the type just described, due to larger tolerances in the shaft bore and bearings than were initially expected. For example, seals of this type are utilized in roller bearing applications where it is intended for the roller bearing components to be urged into their proper positions by outward forces transmitted through the case of the seal, so as to hold the bearing components snugly in place.

Whether the elastomer is supported by a metal expander or whether it is free and is eventually supported by an outer periphery of one of the parts of the bearing does not matter. In either instance, during the assembly procedure the seal itself is axially loaded against some mating hardware, and the rubber extension is thereby deformed, with the intention being that it be forced against the inner periphery of the bore to effect the necessary seal there and prevent loss of lubricant between the bore and the case.

Synthetic rubber, like all elastomers, is essentially incompressible, and if it has no space to move into, then other parts cannot compress it and thereby enables further movement. In assembling the bearing-seal combination, relative motion occurs between the seal case and the metal expander or the thrust bearing of the roller bearing assembly; this relative motion is supposed to continue until the expander or thrust bearing makes contact with the case at the radially-extending flange. If, however, the parts are somewhat different in size from their designed size, the amount of rubber on the extension may exceed the volume provided for it in the assembly; then, once that volume has been filled, no additional displacement between the seal case and the metal expander or roller bearing thrust bearing can occur, thereby leaving an undesirable gap between the metal components. Since the expander, when used, is intended to transmit rigid contact from the seal case to the thrust bearing, it does not matter whether it be the expander or the thrust bearing that fails to make contact. In either instance there is an undesirable looseness which cannot be tolerated.

Unfortunately, the manufacturing tolerances of the manufactured parts, such as the seals, bearings, and expanders, are presently sufficiently broad to result in a very wide spread between the minimum rubber condition and the maximum rubber condition. If one designs the seal with its extended rubber portion small, in order to keep the maximum rubber condition from exceeding 100% of the volume it could fill, there may be too little rubber deformation, so that the bore is not sealed, which is just as undesirable as having the bearing parts loose. Under such conditions, the metal components bottom-out before the rubber toe has been sufficiently displaced; under the other condition it does not bottom-out at all. Both of these conditions are, of course, unsatisfactory.

An object of the present invention is to solve this problem and assure that in every instance there will be a bottoming-out and there will also be a seal against the wall of the bore. Another object is to assure that the flexing of the rubber extension will be outward rather than inward, which would fail to produce the desired sealing. Therefore, the invention makes it possible to assure in every instance that the bore will be sealed and also to assure that in every instance there will be the metal-to-metal contact needed to hold the bearing components in their proper position.

All this, of course, is done within a tolerance itself; however, these tolerances are realistic, whereas the tolerances available without the invention were not able to accomplish the essential results.

The principles of the invention are applicable wherever there is a seal case fitting loosely with regard to some machine part and having a synthetic rubber exterior that is adapted to be deformed in a radial direction in order to seal there.

SUMMARY OF THE INVENTION

The invention combines certain novel features with a rotary shaft seal of the type which has a rigid case, such as a metal case, and an elastomeric sealing element and in which the case has a cylindrical outer periphery that is intended to fit loosely in a slip fit in the bore rather than fitting tightly in a sealing engagement. It applies, of course, where there is a roller bearing having a thrust member which relies on transmission of forces through the seal case in order to assure complete seating of the bearing components. Thus, during installation the seal is moved relatively to the roller bearing until the radial flange of the seal case is fully engaged, either by the thrust bearing of the roller bearing itself or by a metal expander member that fits in between the two and makes contact with the thrust bearing.

In this environment the invention calls for an elastomeric extension which is bonded to the cylindrical flange of the case and which itself is a generally cylindrical member extending axially beyond the case. It is this rubber extension which is to be expanded outwardly to make the seal against the bore wall that prevents leakage, and the outward flexing takes place due to the relative movement of metal members of the assembly. These metal members may be the cylindrical flange of the seal case and the roller bearing, with or without an additional expander piece which, as it is present, will be in between and in contact with both the radial flange of the seal and the thrust bearing when the parts are fully seated, as by the application of some member outside the bore. In the present invention, this elastomeric cylindrical extension has an outer cylindrical wall which will do the sealing against the bore and has a series of axial grooves in alternation with a series of axial ribs along the inner wall. The ribs provide stiffness, which assures that the flexing of the extension will be outward against the bore wall rather than the useless inward flexing, when the axially exerted pressure is applied. The grooves provide space for accommodating displacement of the synthetic rubber when the space between the bore walls and the adjacent metal members has been occupied prior to complete seating of the seal and bearing, thereby enabling the complete seating even under that condition.

More broadly, the invention applies to seals having means for assuring movement of a synthetic rubber extension to a sealing position and to seals having means for accommodating displacement of the elastomer when the elastomer is under compression.

Other objects and advantages of the invention will appear from the following description of a preferred embodiment.

BRIEF DESCRIPTION OF THE DRAWINGS

In the drawings

FIG. 1 is a view in end elevation of a continuous annular seal embodying the principles of the invention.

FIG. 2 is an enlarged view in section of about half of the seal, taken in section along the line 2—2 in FIG. 1.

FIG. 3 is a further enlarged view of a portion of the elastomeric extension portion of the seal of FIG. 2.

FIG. 4 is a view in elevation and in section of a roller bearing installation incorporating the seal of the present invention.

FIG. 5 is a fragmentary view of a portion of the FIG. 4 installation before completion, i.e., before tightening the parts to get the needed metal-to-metal contact.

FIG. 6 is a view similar to FIG. 3 showing the approximate appearance of the gasket portion in a completed installation.

FIG. 7 is a view similar to FIG. 2 of a modified form of seal incorporating the principles of the invention.

DETAILED DESCRIPTION OF THE INVENTION

The seal 10 of FIGS. 1 and 2 is an example of a seal embodying the principles of the invention. It comprises a metal case 11 and an elastomeric sealing element 12 secured as by bonding during molding to the case 11. The elastomeric element 12 has a sealing lip 13 and an auxiliary dust-sealing lip 14; although an auxiliary lip is not essential to the invention. A garter spring 15 exerts pressure on the sealing lip 13 to keep it in contact with a shaft 37 (See FIGS. 5 and 6). The structure and form of the elastomeric sealing element 12 are not vital to the present invention, and other forms may be used.

The case 11 has a cylindrical portion 16 which is adapted to fit into a sliding engagement with a bore rather than a sealing engagement. There is also a radial flange 17 which is important in the seating relationship. In the form shown there is an additional frustoconical portion 18 which goes to an anchorage 19, where the elastomeric element 12 is bonded to the case 11.

The seal 10 has a synthetic rubber or other elastomeric gasket extension 20 having an inner portion 21 that is bonded to the inner surface of the case 11 along the inner side of its cylindrical flange 16 and having an outer portion 22 which lies beyond the end 23 of the cylindrical portion 16. In the present invention the key feature is the structure of this outer portion 22 which has an outer cylindrical surface 24 and an inner surface 25 as shown in FIGS. 1 and 2, made up of a series of ribs 26 alternating with a series of grooves 27. The volume of the grooves 27 is calculated according to the tolerances available to provide a sufficient amount of space for flow of rubber during installation, depending on the tolerance limits of the structure.

The ribs 26 provide stiffness, and this stiffness means that necessarily the portion 22 will be deflected outwardly rather than inwardly; the ribs 26 prevent inward deflection, which of course is ineffective and quite undesirable. At the same time, the grooves 27 provide the space needed to accommodate displacement of excess rubber when the space between the metal parts has been consumed.

FIG. 3 shows a completed installation. A housing member 30 has a bore 31 and a radial wall 32 which seats the outer race 33 of a roller bearing assembly 34. The roller bearing assembly 34 includes roller bearings 35 and a cone 36 which is seated on a shaft 37 having a step 38. A retaining ring 39 press-fitted on the shaft 37 urges the cone 36 into engagement with the step 38.

An outer thrust bearing 40 is intended to abut a wall 41 of the outer race 33. It is important that there be no play in the bearing. The roller bearing in order to operate properly and with minimum wear must have its outer race 33 held firmly against the wall 32, just as the cone 36 has to be held firmly against the step 37.

The sealing lip 13 and the auxiliary lip 14 of the elastomeric element 12 engage the shaft 37 and seal there against loss of lubricant, but lubricant could also be lost if there were not a tight seal against the wall 31 of the bore; and it is for this purpose that the gasket 20 is flexed outwardly to seal against the bore wall 31. This is very important, and the ribs 26 help to assure that this flexing will be outward.

It is also important, however, for there to be no gap such as is shown at G in FIG. 5 between the thrust bearing 40 and the radial flange 17 of the seal case. In FIGS. 4 and 5, the seal 10 is being urged in by an outer member or cap 42 which is tightened to the housing 30 by bolts 43, or is otherwise forced to exert needed pressure. The cap 42 has a radial portion 45 that bears on the flange 17. This should result in complete seating of all the metal members 45, 17, 40, 33 and 32, that insures permanent seating of the outer race 33 against the shoulder 32. However, if a construction similar to the present invention but lacking the grooves 27 were to be used, the installation could result in a final position like what is shown in FIG. 4, in which there is the gap G. The reason for the gap G would then be that there would be no place for the elastomer of the extension 20 to flow, all space between the metal members having been filled with the elastomer. Elastomer is not compressible; it needs a place to flow to.

The present invention, overcomes this difficulty, and, as shown in FIG. 4, the metal members 45, 17, 40, 33 and 32 are fully seated and in engagement with each other. The synthetic rubber, in this invention, flows into the grooves 27 and substantially fills them in the worst conditions (See FIG. 6). Of course, in some conditions there may not be much or any flow, and in other conditions the elastomer may fill only part of the grooves. The point of the invention is that it provides for a wide range of tolerances in which there is no such flow required as well as the condition in which some or even a very substantial amount of flow is required, up until the point where the flow actually fills the grooves 27 completely. This additional volume provided by the grooves 27 is substantial enough to take care of the demanding tolerances in today's work.

FIG. 7 is a modified form of seal 50 embodying the principles of the invention. Here, there is a case 51 and an elastomeric member 52 having a main lip 53 and an auxiliary lip 54. The case 51 has a cylindrical portion 55 and a radial flange 56 adapted for engagement by the cap 45. An elastomeric gasket 57, bonded to the inner surface of the case portion 55 has an extension 58 lying beyond the end 59 of the case portion 55. This extension 58 has the ridges 26 and grooves 27, just as in the seal 10. A force-transmitting annulus 60 has a cylindrical wall 61, an end portion 62 seating the extension 58 and adapted to bear against the thrust bearing 40, and an opposite end portion 63 that bears against the case flange 56 when the installation is completed. The extension 58 is flexed against the bore wall during installation, and then the grooves 27 accommodate elastomer flow until the metal parts 45, 56, 60, 40, 33 and 32 all engage in series to hold the outer race 32 firmly in place against the wall 32.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a rotary shaft seal of the type having a case that fits relatively loosely in a bore and has a flexible synthetic rubber extension bonded thereto and adapted to fit in a space between said bore wall and another machine part and to be forced to seal against the bore wall, as the result of axial pressure exerted thereagainst by said other machine part, the improvement comprising:

said extension being solely of synthetic rubber having an end wall for engaging a shoulder of said machine part and having a first cylindrical wall facing said bore and a second wall on the opposite side of said first wall facing said machine part and having a series of grooves in alternation with a series of stiffening ribs, said grooves providing space for accommodating displacement of said synthetic rubber when the space between said machine part and said bore has been occupied by said extension before complete seating of said seal, thereby enabling said complete seating, said ribs in said second wall helping to support said first wall and, due to their thickness, to assure sealing of said extension between said bore wall and said machine part when the axially exerted pressure is applied.

2. In a rotary shaft seal of the type having a case that fits loosely in a bore and has a flexible synthetic rubber extension bonded thereto and adapted to fit in a space between said bore wall and an axially extending portion of a machine part and to be expanded outwardly to seal against the bore wall, as the result of axially pressure exerted thereagainst, by a shoulder on said machine part, the improvement comprising:

said extension being solely of synthetic rubber and having an end wall for engaging said shoulder and having an outer cylindrical wall and an inner wall having a series of axial grooves in alternation with a series of stiffening axial ribs, said grooves providing space for accommodating displacement of said synthetic rubber when the space between the bore walls and adjacent metal members has been occupied by said extension before complete seating of said seal, thereby enabling said complete seating, said ribs by their thickness and location helping to assure the sealing off of said space when the axially exerted pressure is applied.

* * * * *